(12) United States Patent
Flaharty et al.

(10) Patent No.: US 7,401,527 B2
(45) Date of Patent: Jul. 22, 2008

(54) WINDSHIELD WIPER PRESSURE SENSOR

(75) Inventors: James P. Flaharty, Farmington, MI (US); Christian Arthur Trager, Canton, MI (US); Nicholas G. Ruark, Pataskala, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/548,376

(22) Filed: Oct. 11, 2006

(65) Prior Publication Data

US 2008/0110277 A1     May 15, 2008

(51) Int. Cl.
    *G01N 3/08*     (2006.01)
(52) U.S. Cl. ........................................................ 73/818
(58) Field of Classification Search ..................... 73/818
    See application file for complete search history.

(56) References Cited

U.S. PATENT DOCUMENTS

| | | | | |
|---|---|---|---|---|
| 3,110,056 A | * | 11/1963 | Oishei et al. | 15/250.12 |
| 3,387,316 A | * | 6/1968 | Pearse | 15/250.351 |
| 3,417,421 A | * | 12/1968 | Retke | 15/250.41 |
| 3,902,106 A | * | 8/1975 | Kearns | 318/443 |
| 4,137,598 A | * | 2/1979 | Sharp | 15/250.46 |
| 4,365,520 A | | 12/1982 | Zaghi | |
| 4,506,557 A | | 3/1985 | Jacobson et al. | |
| 4,860,224 A | | 8/1989 | Cashell et al. | |
| 5,056,182 A | * | 10/1991 | Fukumoto et al. | 15/250.202 |
| 5,062,175 A | * | 11/1991 | Buchanan et al. | 15/250.203 |
| 5,119,002 A | * | 6/1992 | Kato et al. | 318/444 |
| 5,184,515 A | | 2/1993 | Terry et al. | |
| 5,271,121 A | * | 12/1993 | Dolegowski | 15/250.3 |
| 5,383,249 A | * | 1/1995 | Yang | 15/250.201 |
| 5,450,754 A | | 9/1995 | Biebl et al. | |
| 5,526,697 A | | 6/1996 | Tada et al. | |
| 5,613,267 A | * | 3/1997 | Battlogg | 15/250.202 |
| 5,756,904 A | | 5/1998 | Oreper et al. | |
| 5,983,727 A | | 11/1999 | Wellman et al. | |
| 6,044,717 A | | 4/2000 | Biegelsen et al. | |
| 6,287,007 B1 | * | 9/2001 | Zimmer | 384/140 |
| 6,637,273 B2 | | 10/2003 | Okada et al. | |

FOREIGN PATENT DOCUMENTS

| | | |
|---|---|---|
| DE | 3307533 | 9/1984 |
| DE | 19649230 | 6/1998 |
| EP | 0379524 | 8/1990 |
| JP | 06186039 | 7/1994 |
| JP | 06281532 | 10/1994 |
| JP | 10073506 | 3/1998 |
| WO | WO03/036612 | 5/2003 |

\* cited by examiner

*Primary Examiner*—Edward Lefkowitz
*Assistant Examiner*—Octavia Davis
(74) *Attorney, Agent, or Firm*—Gifford, Krass, Sprinkle, Anderson & Citkowski, P.C.

(57) ABSTRACT

A pressure sensor assembly for measuring the pressure between a windshield and a windshield wiper. The pressure sensor assembly includes a support structure, a strain gage and a bearing member. The support structure supports the wiper spaced apart from the windshield. The strain gage is coupled to the support structure for providing pressure measurement data corresponding to the amount of strain in the support wall due to the pressure applied by the wiper toward the windshield. The bearing member is fixedly secured to the support structure to minimize friction between the pressure sensor assembly and the windshield.

19 Claims, 3 Drawing Sheets

_US 7,401,527 B2_

WINDSHIELD WIPER PRESSURE SENSOR

BACKGROUND OF THE INVENTION

1. Field of the Invention

The invention relates to a sensing device for sensing pressure between a windshield wiper and a windshield. More particularly, the invention relates to a sensing device that can measure pressure between the wiper and windshield under both static and dynamic conditions.

2. Description of the Related Art

In the development of windshield wiper designs, it is desirable to test the performance of a wiper by determining the pressure applied by the wiper on a windshield. Thus, it remains desirable to provide a sensor design that facilitates a measurement of pressure between the wiper and the windshield. It is also desirable to provide a sensor that allows the measurement of pressure between the wiper and the windshield under both a static condition, wherein the wiper is held in one position on the windshield, and a dynamic condition, wherein the wiper moves along the windshield.

SUMMARY OF THE INVENTION

According to one aspect of the invention, a pressure sensor assembly is provided for sensing the pressure between a windshield and a windshield wiper. The pressure sensor assembly includes an end wall, a base wall, a support wall and a strain gage. The base wall extends from the end wall and is configured for sliding contact with the windshield. The support wall extends from the end wall and has a distal end configured to support the wiper spaced above the windshield. The strain gage is coupled to the support wall for providing pressure measurement data corresponding to the amount of displacement of the support wall due to the pressure applied by the wiper toward the windshield.

According to another aspect of the invention, a pressure sensor assembly is provided for sensing the pressure between a windshield and a windshield wiper. The pressure sensor assembly includes a support structure, a strain gage and a bearing member. The support structure supports the wiper spaced apart from the windshield. The strain gage is coupled to the support structure for providing pressure measurement data corresponding to the amount of strain in the support structure due to the pressure applied by the wiper toward the windshield. The bearing member is fixedly secured to the support structure to minimize friction between the pressure sensor assembly and the windshield.

BRIEF DESCRIPTION OF THE DRAWINGS

Advantages of the present invention will be readily appreciated as the same becomes better understood by reference to the following detailed description when considered in connection with the accompanying drawing, wherein.

DESCRIPTION OF THE INVENTION

Figure 1:
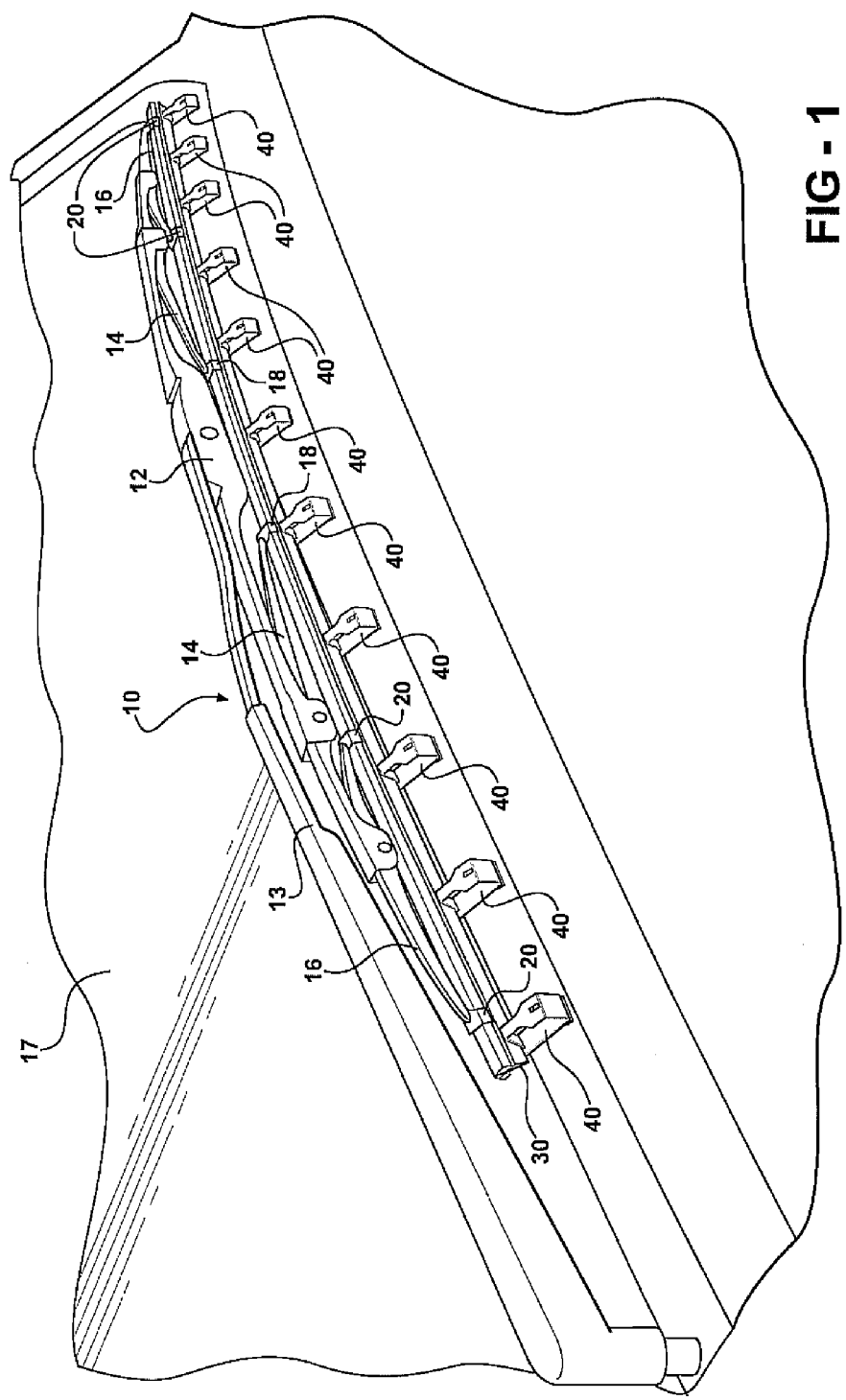
FIG. 1 is a perspective view of a plurality of pressure sensors disposed along a blade of a windshield wiper according to one embodiment of the invention.

Referring to FIG. 1, a windshield wiper is generally indicated at 10. The wiper 10 includes a blade defined by a plurality of bows 12, 14, 16 and a rubber element 30. One of the bows is a center bow 12 pivotally coupled to a main pivoting arm 13, which in turn is driven by a wiper motor (not shown) for moving the wiper 10 in a reciprocating manner across a windshield 17. The other bows 14, 16 are pivotally coupled to each other and carried by the center bow 12 for movement therewith. The other bows 14, 16 include claws 18, 20 for supporting the rubber element 30. The bows 12, 14, 16 are highly curved to force the rubber element 30 to match the flatter curvature of the windshield 17. Additionally, the wiper 10 includes a conventional biasing mechanism that pushes the blade against the windshield. A plurality of pressure sensors 40 are disposed between the wiper 10 and the windshield 17. Described in greater detail below, the pressure sensors 40 are designed to allow measurement of the pressure applied on the windshield 17 by the wiper 10 under both static and dynamic conditions.

Figure 2:
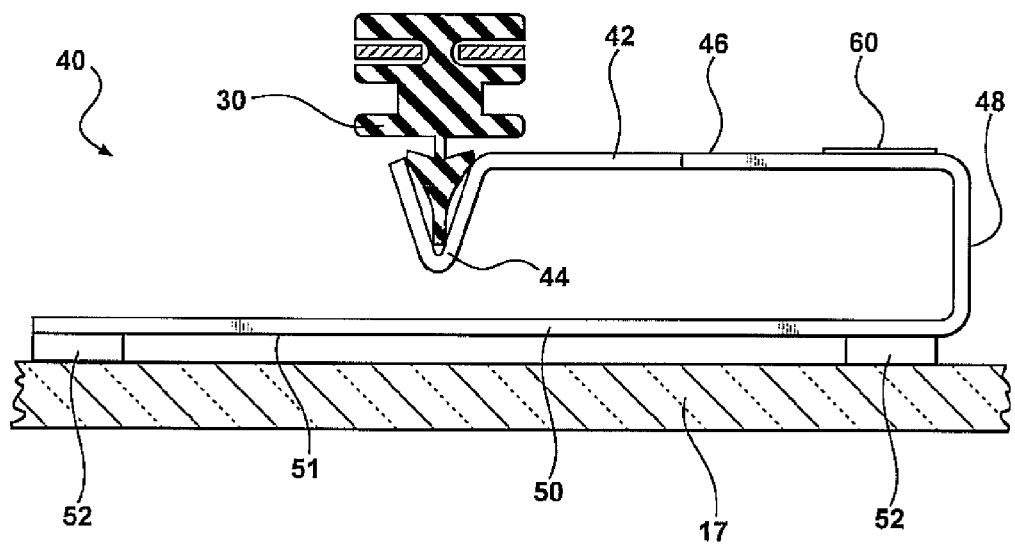
FIG. 2 is a front elevational view of one of the pressure sensors according to the invention.
Figure 3:
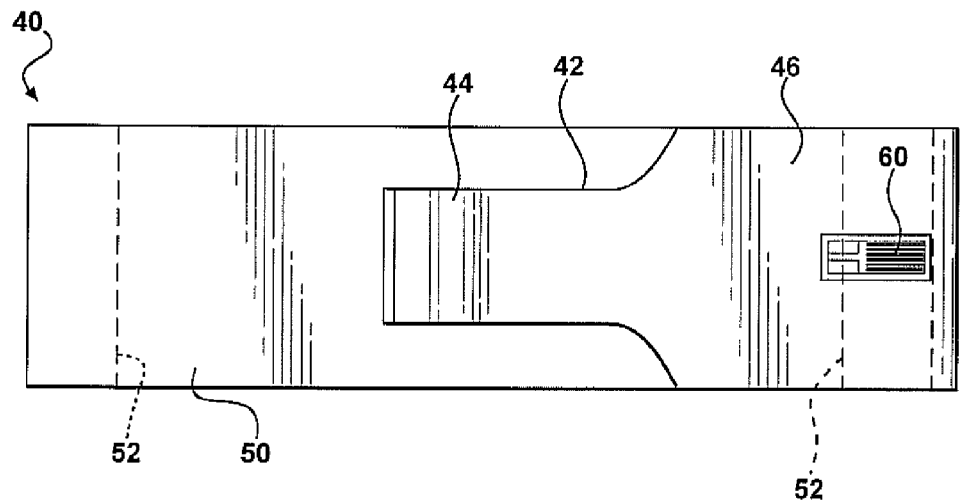
FIG. 3 is a top elevational view of the pressure sensor of FIG. 2.
Figure 4:
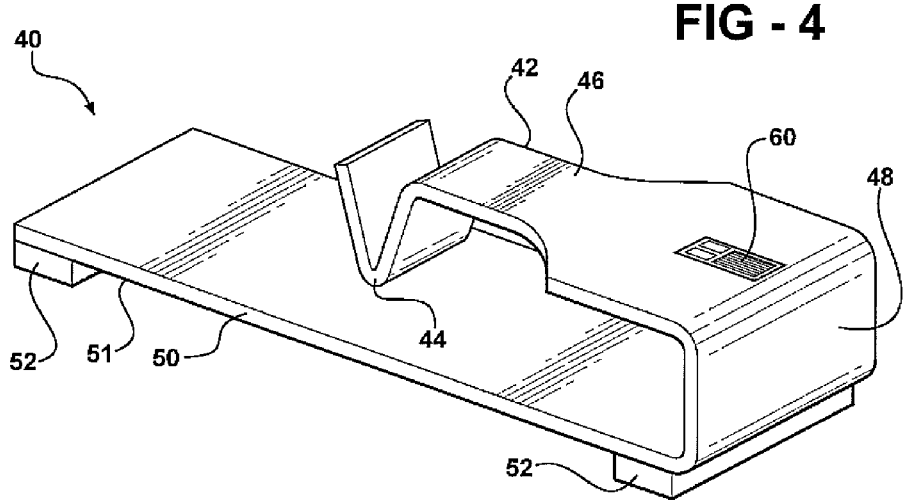
FIG. 4 is a perspective view of the pressure sensor of FIG. 2.

Referring to FIGS. 2-4, each pressure sensor 40 includes a support structure defined by an end wall 48, a support wall 42 and a base wall 50. The support 42 and base 50 walls extend outwardly from one side of the end wall 48. The support 42 and base 50 walls are spaced apart and generally parallel to each other. The support wall 42 includes a distal end 44 that is generally shaped like a trough for supporting the rubber element 30 of the wiper 10.

At least one low-friction or bearing member 52 is coupled to a bottom surface 51 of the base wall 50 for minimizing friction between the sensor 40 and the windshield 17 as the wiper 10 moves in a reciprocal motion across the windshield 17. The bearing member 52 is formed from plastic, or other suitable low friction materials known by those having ordinary skill in the art. Alternatively, ball bearings or rollers, or other suitable friction reducing arrangements known by those skilled in the art may be utilized to reduce the friction between the wiper 10 and the windshield 17. Each pressure sensor 40 also includes a strain gage 60. The strain gage 60 is coupled to the support wall 42. More specifically, the strain gage 60 is fixedly secured along a top surface 46 of the support wall 42. The strain gage 60 provides an electrical signal corresponding to the amount of deformation or strain in the support wall 42.

Figure 5:
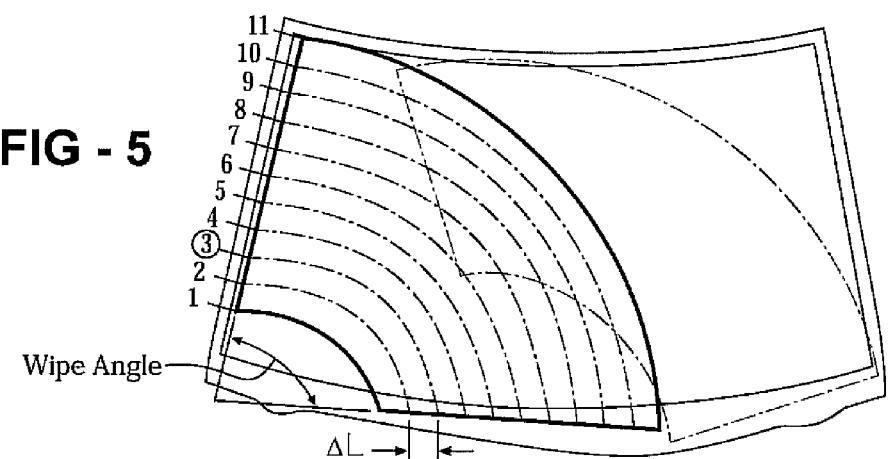
FIG. 5 is a schematic showing the travel path of the sensors as the windshield wiper moves across the windshield.
Figure 6:
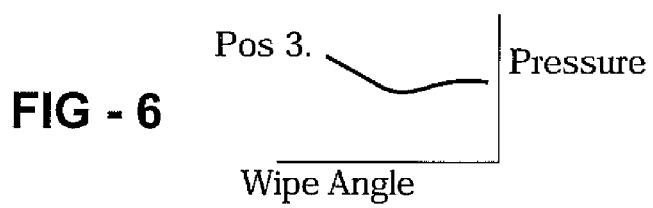
FIG. 6 is a graph of pressure versus wiper angle based on measurement data provided by a number "3" sensor as indicated in FIG. 5.

In use, a plurality of sensors 40 are positioned along the length of the wiper 10 between the rubber element 30 and the windshield 17. By this arrangement, the wiper 10 does not directly touch the windshield 17 and the pressure applied by the wiper 10 against the windshield 17 is carried by the sensors 40. Each of the sensors 40 is coupled to a processor (not shown). The processor is preprogrammed with calibration information for each sensor 40 correlating the electrical signal to a pressure measurement. The processor (not shown) receives the signals from the strain gages 60, which are translated to pressure measurements. The pressure measurements are stored in a storage medium coupled to the processor. Pressure measurements may be taken while the wiper 10 moves across the windshield 17. The processor may be programmed to create a graph of the amount of pressure versus wiper position or angle. An example of such a graph is shown in FIG. 6, which shows a graph of pressure versus wiper angle based on the measurement data provided by a number "3"

sensor on the wiper, as indicated in FIG. 5. Pressure measurements may also be taken while the wiper 10 is maintained at any one position on the windshield 17.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A pressure sensor assembly to be positioned between a windshield and a windshield wiper and for sensing the pressure between the windshield and the windshield wiper, said pressure sensor assembly comprising:
   an end wall;
   a base wall extending from the end wall, the base wall being configured for sliding contact with the windshield;
   a support wall spaced apart from the windshield, extending from the end wall and having a distal end configured to support the wiper spaced above the windshield; and
   a strain gage coupled to the support wall for providing pressure measurement data corresponding to the amount of displacement of the support wall due to the pressure applied by the wiper toward the windshield.

2. A pressure sensor assembly as set forth in claim 1, wherein the distal end of the support wall includes a trough that supports the wiper therein.

3. A pressure sensor assembly as set forth in claim 2, wherein the trough is generally V-shaped.

4. A pressure sensor assembly as set forth in claim 1, wherein the base and support walls extend from opposite ends of the end wall.

5. A pressure sensor assembly as set forth in claim 4, wherein the base and support walls are generally parallel and spaced apart from each other.

6. A pressure sensor assembly as set forth in claim 1, further comprising a bearing member located between the support wall and the windshield, the bearing member fixedly secured to the base wall for minimizing friction between the base wall and the windshield.

7. A pressure sensor assembly as set forth in claim 6, wherein the bearing member is formed from plastic.

8. A pressure sensor assembly as set forth in claim 1 further comprising a pair of bearing members located between the support wall and the windshield, the bearing member positioned at opposite ends of the base wall for minimizing friction between the base wall and the windshield.

9. A pressure sensor assembly to be positioned between a windshield and a windshield wiper and for sensing the pressure between the windshield and the windshield wiper, said pressure sensor assembly comprising:
   a support structure supporting the wiper spaced apart from the windshield;
   a strain gage coupled to the support structure for providing pressure measurement data corresponding to the amount of strain in the support structure due to the pressure applied by the wiper toward the windshield; and
   a bearing member located between the support structure and the windshield, the bearing member fixedly secured to the support structure to minimize friction between the pressure sensor assembly and the windshield.

10. A pressure sensor assembly as set forth in claim 9, wherein the bearing member is fanned from plastic.

11. A pressure sensor assembly as set forth in claim 9, further comprising a pair of bearing members spaced apart for minimizing friction between the pressure sensor assembly and the windshield.

12. A pressure sensor assembly as set forth in claim 9, wherein the support structure includes an end wall That extends generally orthogonally relative to the windshield.

13. A pressure sensor assembly as set forth in claim 12, wherein the support structure includes a base wall and a support wall extending from opposite ends of the end wall.

14. A pressure sensor assembly us set forth in claim 13, wherein the support wall extends in a generally cantilevered manner over the base wall, the support wall having a distal end configured for supporting the wiper spaced above the windshield.

15. A pressure sensor assembly as set forth in claim 14, wherein the distal end of the support wall includes a trough that supports The wiper above the base wall.

16. A pressure sensor assembly as set forth in claim 14, wherein the strain gage is secured to the support wall for providing pressure measurement data corresponding to the amount of displacement of the support wall due to the pressure applied by the wiper toward the windshield.

17. A pressure sensor assembly as set forth in claim 13 further comprising a pair of bearing members fixedly secured to the base wall for minimizing friction between the base wall and the windshield.

18. A pressure sensor assembly as set forth in claim 17, wherein the bearing members are made of plastic.

19. A pressure sensor assembly to be positioned between a windshield and a windshield wiper and for sensing the pressure between the windshield and the windshield wiper, said pressure sensor assembly comprising:
   an end wall;
   a base wall extending from the end wall, the base wall being configured for sliding contact with the windshield;
   a support wall spaced apart from the windshield, extending from the end wall and having a distal end configured to support the wiper spaced above the windshield;
   a strain gage coupled to the support wall for providing pressure measurement data corresponding to the amount of displacement of the support wall due to the pressure applied by the wiper toward the windshield; and
   a bearing member located between the support wall and the windshield, the bearing member fixedly secured to the base wall for minimizing friction between the base wall and the windshield.

* * * * *

UNITED STATES PATENT AND TRADEMARK OFFICE
CERTIFICATE OF CORRECTION

PATENT NO. : 7,401,527 B2  
APPLICATION NO. : 11/548376  
DATED : July 22, 2008  
INVENTOR(S) : James P. Flaharty It is certified that error appears in the above-identified patent and that said Letters Patent is hereby corrected as shown below:

Column 4, line 8 replace "fanned" with --formed--  
Column 4, line 14 replace "That" with --that--  
Column 4, line 19 replace "us" with --as--  
Column 4, line 26 replace "The" with --the--

Signed and Sealed this

Twenty-fourth Day of February, 2009

JOHN DOLL  
*Acting Director of the United States Patent and Trademark Office*